E. G. COOK.
SHOCKER.
APPLICATION FILED MAR. 16, 1917.

1,264,368.

Patented Apr. 30, 1918.
5 SHEETS—SHEET 2.

INVENTOR
EARL G. COOK

UNITED STATES PATENT OFFICE.

EARL GOODWIN COOK, OF PINCHER STATION, ALBERTA, CANADA.

SHOCKER.

1,264,368. Specification of Letters Patent. Patented Apr. 30, 1918.

Continuation in part of application Serial No. 104,216, filed June 16, 1916. This application filed March 16, 1917. Serial No. 155,296.

*To all whom it may concern:*

Be it known that I, EARL GOODWIN COOK, of the village of Pincher Station, in the Province of Alberta, Canada, have invented certain new and useful Improvements in Shockers, of which the following is the specification.

My invention relates to improvements in shockers and the object of the invention is to devise a simple efficient shocker which is positive in its action, will stand the roughest usage and be less likely to get out of order and which will grip and support the shock from end to end, so that the proper shape of the shock to insure its standing upon being delivered is maintained until it reaches the ground.

A further object is to so deliver the shock that all liability of tipping the shock due to the momentum of the machine moving forward is entirely obviated.

A still further object is to deliver the shock through the shortest possible space before it reaches the ground and thereby prevent to a maximum extent the spilling of the grain during its delivery to the ground.

Yet another object is to dispense with all toothed gearing, and the trouble incident thereto.

My invention consists essentially in the arrangement and construction of parts as hereinafter more particularly explained. This invention is an improvement upon my application, Serial No. 104,216.

Fig. 7, is an enlarged perspective detail of the near portion of the gripping mechanism and adjacent parts showing the parts in the normal position.

Fig. 12, is a plan section through the eccentric and co-acting parts.

In the drawings like letters of reference indicate corresponding parts in the various figures.

Figures 2, 11, 16, 17:
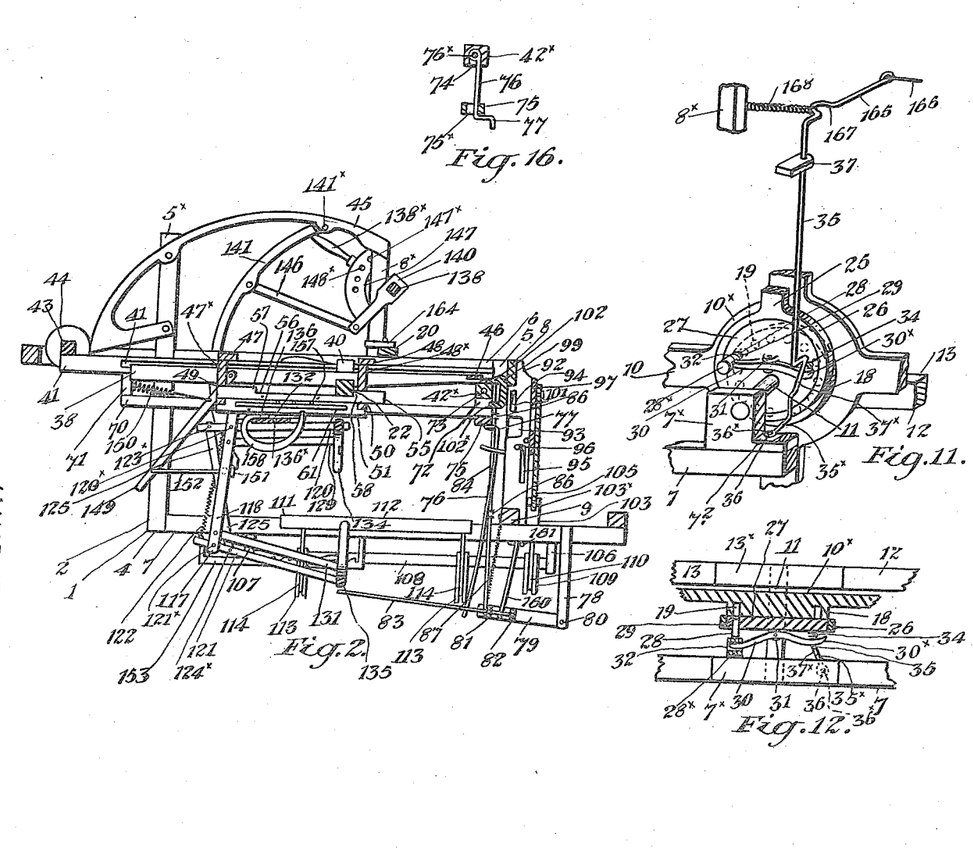
Fig. 2, is a longitudinal section showing the parts in the normal position or the position they assume when receiving the sheaves.
Fig. 11, is an enlarged perspective detail of the main operating eccentric and the means for throwing it in and out of gear with the main carrying wheel.
Fig. 16, is a sectional detail showing the means for pivotally connecting the fingers of the sheaf supporting mechanism to the tilting frame.

1 indicates the main frame comprising side members 2 and 3, each comprising a rear vertical member 4 and front vertical member 5, top horizontal member 6 and bottom horizontal member 7. The top horizontal member 6 extends rearwardly of the vertical members 4 and are connected together by a cross bar 6×. The forward ends of the side members 2 and 3 are connected together by an upper cross bar 8 and lower cross bar 9. The bottom horizontal bars 7 project forwardly of the vertical members 4, such projecting ends being connected by a cross bar 9×. 10 indicates the main carrier wheel mounted upon the shaft 11 carried on the wheel frame 12 comprising a member 13 extending parallel to the member 7 and the connecting member 14 and lateral extension of the cross bar 9× connected to the forward ends of the members 7 and 13. The shaft 11 is journaled in bearings 13× and 7×, the bearing 13× being carried by the member 13 and the bearing 7× by the member 7. 18 indicates a disk (see Figs. 11 and 12). The disk 18 is formed integral with or secured to the hub 10× of the wheel 10. 19 indicates a series of recesses formed in the disk 18, such series being concentric with the center of the wheel 10. The side frames 2 and 3 are also connected together by a cross bar 20 extending between the top horizontal members 6 of such frames 2 and 3 intermediately of their length. 21 indicates a bearing depending from each of the top horizontal members 6 of the side frames 2 and 3. 22 indicates a rocking shaft provided with rounded portions 23 and 23× journaled in the bearings 21. 24 indicates an arm secured to the outer end 22× of the rocking shaft 22.

25 indicates a pitman bar provided at its lower end with an eccentric strap 26 and pivotally connected at its upper end to the outer end of the arm 24. 27 indicates an eccentric mounted freely upon the shaft 11 and around which the strap 26 extends. 28 indicates a plunger slidable freely within an orifice 29 located in the eccentric 27 in a line with the annular series of orifices 19. The plunger 28 is provided with a head 28× in which is formed a diametric slot 32. 30 indicates a lever pivotally mounted intermediately of its length in bearing lugs 31 carried by the eccentric 27. One end of the lever 30 extends into the diametric slot 32. The opposite end of the lever 30 is provided with a rounded outer portion 30×. 34 indicates a compression spring extending between the eccentric and the inner face of the lever 27 having the rounded outer portion 30×. 8× indicate standard bars extending upwardly from the horizontal member 6 in proximity to the cross bar 20. 35 indicates a vertical rod having an inturned lower end 35× having an eye 36 at its inner end pivotally connected by a pin 36× in the slot 7² formed in the bearing piece 7×. The rod 35 is journaled at its upper end in a bracket piece 37 extending from the horizontal member 6 adjacent to the carrying wheel 10. The upper end of the rod 35 is provided with an out-turned portion 165 which is connected by a cord or other suitable device 166 (see Fig. 11) to an operating lever carried by the binder in a suitable position. The out-turned portion 165 is provided with a loop portion 167 which is connected by a tension spring 168 to the standard bar 8×.

Figures 3, 4, 9, 10:
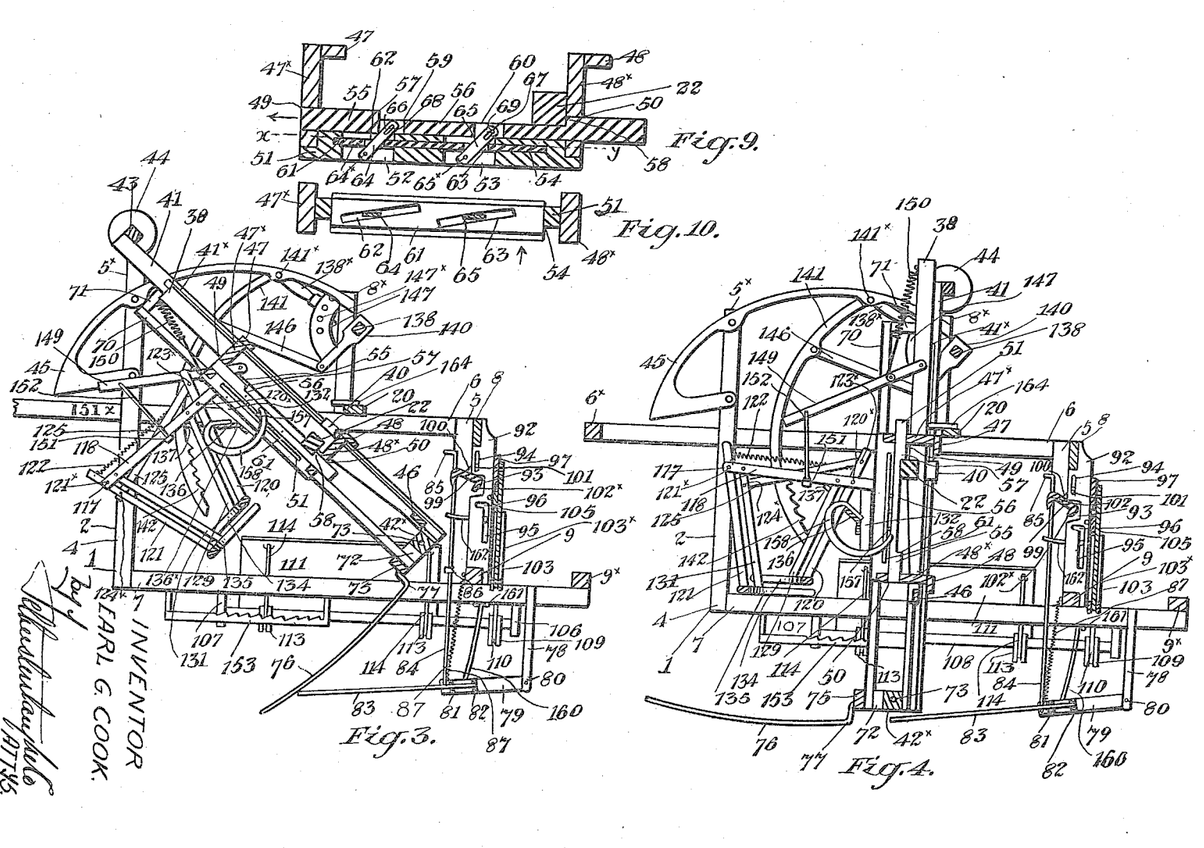
Fig. 3, is a similar view to Fig. 2 showing the parts in the position they assume when the operation of up-ending the shock is partially completed, and the shock is at an inclined position.
Fig. 4, is a similar view to Figs. 2 and 3 showing the parts in the position they assume as the butt of the shock is brought into contact with the ground.
Fig. 9, is an enlarged sectional detail of the locking device for the gripping mechanism.
Fig. 10, is a sectional plan through Fig. 9 on line $x-y$.

The rod 35 is provided in proximity to its lower end with an off-set portion 37×. Such off-set portion is ratchet shape, the inclined portion normally bearing against the rounded end 30× of the lever 30. 38 and 39 indicate horizontal bars secured to the rocking shaft 22. 40 indicate guideways carried by the rocking shaft 22 in proximity to each side frame 2 and 3. 41 and 42 indicate normally horizontal bars slidably held in the guideways 40. 43 indicates a cross bar connecting the rear ends of the bars 41 and 42 together. 44 indicates a roller journaled on the reduced portions 44× extending from each end of the cross bar 43. Each upright 5 of the side frames 2 and 3 is provided with an upward extension 5×. 45 indicates a swivel track way located at each side of the machine and secured to the upwardly extending portion 5× of the member 5 and the corresponding standard member 8×. The rollers 44 are designed to travel on the upper periphery of the trackways 45 during the return movement of the machine from the discharging position to the normal position, these trackways being eccentric to the center of swing formed by the center of the rocking shaft 22. The forward ends of the bars 38 and 39 are connected together by a cross bar 46 provided with laterally extending ends 46× and 46′. 41× indicate grooves formed in the bars 41 and 42 extending longitudinally of such bars from a point in proximity to their rear ends, to their extreme forward ends and into which the lateral extensions 46× and 46′ extend so as to be slidable thereon. The bars 41 and 42 are connected together by cross bars 47 and 48 intermediately of their length and at their forward end by a cross bar 42×. 47× indicates a depending member carried by the cross bar 47 and 48× indicates a depending member carried by the cross bar 48. The members 47× and 48× are provided with alined orifices 49 and 50. 51 indicates a bar connecting the lower ends of the depending members 47× and 48× together, such bar being provided with vertical slots 52 and 53 and a horizontal slot 54. 55 indicates a slide bar slidably held within the orifices 49 and 50, such bar being provided with a longitudinal recess 56 forming shoulders 57 and 58 which are alternately designed to be brought into engagement with the opposite normally vertical faces of the rocking shaft 22. Extending through the slide bar 55 from the base of the recess 56 are slots 59 and 60. 61 indicates a plate provided with slots 62 and 63 set at an angle to the longitudinal center of the plate 61. The plate 61 is freely held within the slot 54 in a bar 51. 64 and 65 indicate links (see Figs. 9 and 10), the link 64 being pivotally secured by a pin 64× in the slot 52 and the link 65 by a pin 65× in the slot 53. The upper ends of the links are provided with longitudinal slots 66 and 67, such upper ends being secured within the slots 59 and 60 by pins 68 and 69 extending through the slots 66 and 67. 70 indicates a guide bar located beneath each bar 41 and 42, the rear ends of such guide bars being connected to the bars 41 and 42 by spacing pieces 71 and the forward ends by spacing pieces 72 to the cross bar 42$^x$. 73 indicates a rod which extends longitudinally through the bar 42$^x$. The lower face of the bar 42$^x$ is provided with recesses 74 (see Fig. 16). 75 indicates a cross bar carried by the forward ends of the guide bars 70. 75$^x$ indicate slots formed in the bar 75. 76 indicate fingers provided at their upper ends with eyes 76$^x$ through which the rod 73 extends so that such fingers are swingably mounted thereon. The fingers 76 depend downwardly through the recesses 74 and through the slots 75$^x$ and are provided directly beneath the cross bar 75 with forwardly offset portions 77, the main portion of the finger depending from such offset into proximity with the ground and curving slightly rearwardly as it approaches the ground level when in normal position. 78 indicate hanger bars depending from each member 7 in proximity to its forward end. 79 indicate arms pivotally connected at their forward ends to the hanger bars 78 at 80. The arms 79 are connected by cross bars 81 and 82. 83 indicate fingers secured in such cross bars and extending rearwardly in a slightly upwardly inclined direction when in normal position.

84 indicate rods which at their lower ends are looped around each outermost finger 83 and provided at their upper ends with inturned portions 85 extending normally over the cross bar 42$^x$ engaging therewith. The rod 84 is slidably held in suitable lugs or brackets 86 extending from each forward vertical member 5. 87 indicates a tension spring secured at its lower end to the cross bar 81 and at its upper end to the cross bar 9. 88 indicates a portion of the deck of the binder (see Fig. 6). 89 indicates the usual sleeve bearing shaft provided with the usual sleeve bearing 90. 91 indicates a bracket depending therefrom. 92 indicates a vertical bar located centrally of the machine and secured at its lower end to the cross bar 9 and at its upper end to the cross bar 8. The forward vertical face of the bar 92 is provided with a recess 93. 94 indicates a vertical slot formed in the bar 92 between the recess 93 and the cross bar 8. 95 indicates a vertical slot formed in the bar 92 below the recess 93 and in proximity to its forward edge, the upper end of the slot being provided with a rearward horizontal extension 96. 97 indicates a channel piece extending around the front of the bar 92 and slidable thereon, the channel piece being provided with rearwardly extending lug portions 98. 99 indicates a locking piece provided with rearwardly extending lugs 100, such lugs extending between the vertical bar 92 and lugs 98. 101 indicates a pin extending through the lugs 98 and 100 and through the slot 94. 102 indicates a rearward projection extending from the upper end of the piece 99 and designed to extend, when the parts are in their normal position, directly above the cross bar 42$^x$ and in contact therewith. 102$^x$ indicates a projection extending rearwardly from the lower end of the piece 99 to beneath the cross bar 42$^x$. 103 indicates a bell crank pivotally mounted at 104 upon a suitable portion of the cross bar 9, one arm of such bell crank being connected by a link 105 to the channel piece 97. 106 and 107 indicate hangers extending from the horizontal member 7 on the side of the machine remote from the main wheel 10. 108 indicates a rocking bar journaled in the hangers 106 and 107. 109 indicates an arm secured to the rocking shaft 108 and depending therefrom, the lower end being connected by a link 110 to the upwardly extending arm 103$^x$ of the bell crank 103. 111 indicates a cut-off plate comprising a broad inverted V-shape portion 112 extending substantially over the longitudinal member 7 remote from the main wheel 10, the narrow part of the V extending inwardly of the machine and the wide part extending outwardly and downwardly in slightly curved form over the rocking shaft 108. 113 indicate arms secured to the rocking shaft 108. 114 indicate links pivotally connected at their lower ends to the arms 113 and swingably connected at their upper ends to the lower face of the cut-off plate 111 immediately to the outside of the corresponding longitudinal bar 7. 115 indicates a slightly curved plate which is pivotally connected at its outer end to the deck 88 of the binder and rests at its inner end upon the cut-off plate 111. 116 indicates one of three spring loop members which extends upwardly preferably in the form of a finger, the free end of the loop depending down toward the inverted V-shape portion 112 of the cut-off plate, through an eye secured to the plate 5$^3$ on the base 6, the finger being spaced apart from the cut-off plate 111 a sufficient distance to allow the passage of a sheaf into the machine.

I will now describe the gripping device by which the sheaves are gripped and compressed into the shock.

117 indicate double arms which depend from each of the guide bars 70, the upper end of such double arm being formed into an eye portion 117$^x$ slidable upon the guide bar 70, the members 118 and 119 of the double bar depending downwardly spaced apart. Each double arm 117 carries a main upper gripping arm 120 pivoted between the members 118 and 119 at 120× and a lower main gripping arm 121 pivoted between the members 118 and 119 at 121×. The portions of the upper and lower main gripping arms 120 and 121 extending rearwardly of the depending arm 117 forming tail pieces are connected together by a tension spring 122. 123 indicates a slot formed in that end of the arm 120 to the rear of the depending arm 117. 124 indicates a slot formed in the lower main gripping arm 121 in front of the depending arm 117. 125 indicates a link extending through slots 123 and 124 and pivotally secured therein by pins 123× and 124× (see Fig. 7). The opposite or forward ends of the main gripping arms 120 and 121 are provided with forks 126 and 127. 128 indicates a depending piece pivotally secured at its upper end by a pin 126× in the fork 126. 129 indicates a link pivotally connected at its forward end at 129× to the depending piece 128 and at its opposite end at 128× between the members 118 and 119 of the depending arms 117.

130 indicates an upwardly extending piece pivoted at its lower end at 130× in the jaw 127. 131 indicates a link similar to the link 129 pivotally connected at 131× to the piece 130 and at the opposite end between the members 118 and 119 of the depending arms 117. Each arm 117 is provided with a forwardly extending supplemental bearing piece 132 provided with an eye 133 extending around the guide bar 70 so as to be slidable thereon. To the lower depending ends of the pieces 128 is secured an upper gripping fork 134 and to the upwardly extending end of the piece 130 is secured a lower gripping fork 135. The approaching ends of the gripping forks 134 and 135 slightly overlap, the lower gripping arm 121 and link 131 being slightly longer than the upper gripping arm 120 and co-acting link 129. 136 indicates a thin cross bar provided with a rounded rearward lower edge, the opposite or forward edge of the bar being hingedly secured at 136× to the bearing piece 132.

It will be noted that the outer ends of the bar 136 extend between the bearing piece 132 and upper gripping arm 120 so as to project beyond the same. 137 indicate tongues which are secured to the projecting ends of the bar 136.

138 indicates a rocking bar journaled in bearings 139 carried by the standard bars 8×. 140 indicate arms secured to the rocking bar 138 in proximity to each end thereof. 141 indicates an arc-shaped bar pivotally connected to each trackway 45 at 141×. The bar 141 depends downwardly against the inner face of each longitudinal member 7. The inner edges of the bar 141 in proximity to their lower end are provided with ratchet teeth 142 with which the tongue 137 is designed to engage at each side. 143 indicates a bar of a similar arc to the bar 141 and secured at each end thereof to the bar 141 by spacing pieces 144 and 145 so as to form a guiding loop. Each bar 141 is connected intermediately of its length by a link 146 to a corresponding arm 140. One end of the rocking rod 138 is provided with a lever 138× which may be manually operated or connected by suitable means to an operating lever carried by the binder in a location suitable for operation by the driver to accommodate longer or shorter grain.

147 indicates an arc bracket provided with a series of perforations 147×. 148 indicates a perforation formed in the lever 138×. 148× indicates a pin extending through such perforation and one of the perforations 147 so as to secure the lever in a stationary position when set. 149 indicate bars pivotally connected at their upper ends to each of the bars 138 and 139. Such bars depend in a rearwardly inclined direction and are connected intermediately of their length by a spiral spring 150 to the forward end of each bar 38 and 39. 151 indicates a cross bar connecting the depending arms 117 located beneath each guide bar 70 together. 152 indicates a link rod connecting the bar 149 with the cross bar 151.

153 indicates a ratchet rack bar suitably connected to each lower bar member 7. 154 indicates a gravity pawl carried by the piece 130 and engaging with the ratchet rack 153.

155 indicates a pin extending outwardly from each bar 38 and 39. 156 indicates a spring held dog, the engaging end 156× of which is held normally in engagement with the pin 155 by means of the spring 155×. 157 indicate pins extending from the bar 51. 158 indicates an arc-shape finger secured to the cross bar 136 in proximity to one side of the bar 51, the side of the finger adjacent to such bar being provided with a ratchet face 159.

160 indicates a loop member extending at its lower end around the central finger 83 and curving upwardly around the bar 9, the upper portion of the loop extending normally through the horizontal portion 96 of the slot 95, (see Figs. 3, 4 and 13). 161 indicates a staple bolt by which the loop bar is held in place and through which such loop bar slides. It will be understood that the loop bar 160 is a spring bar, the normal tendency of the spring being to hold the upper end of such loop bar against the extreme end of the horizontal portion 96 of the slot 95. 162 indicates a fork member swingably held in the vertical bar 92 and having depending portions 162× which rest in the normal position against the upper end of the loop member 160. The members 162× of the fork project rearwardly into the path of the cross bar 42×. 163 indicates a pin limiting the downward movement of the fork.

164 indicate plates secured to the cross bar 20 so as to project rearwardly therefrom and against which the dogs 156 are brought when the rocking shaft 22 is turned so as to carry the mechanism to the position for delivering the shock.

Having described the principal parts involved in my invention I will briefly describe the operation of the same.

Normally the pin 28 is in the withdrawn position as shown particularly in Fig. 12 of the drawings and consequently there is no driving connection between the carrying wheel 10 and the eccentric 27. During this time the sheaves are fed one at a time by the ordinary kicker mechanism from the binder deck 88 over the apex of the inverted V-portion 112 to between the gripping arms 134 and 135, one sheaf being pushed ahead of the other until the space between the gripping arm is filled. When the machine has reached the point where it is desired to deposit the shock the operator pulls upon the cord 166 thereby drawing the out-turned portion 165 of the bar 35 in the same direction against the tension of the spring 168 and carrying the off-set portion 37× away from the rounded end of the lever 30. The spring 34× forces this end of the lever outwardly and the opposite end inwardly to carry the pin 28 in to one of the recesses 19 of the disk 18 secured to the hub 10× of the wheel 10. As soon as the operator releases the cord 166 the spring 168 turns the rod 35 back to its normal position and the offset 37× into the path of the rounded end of the lever 30. By this means the rotary movement of the carrying wheel is transmitted to the eccentric 27, which rotating in the eccentric strap 26, draws the pitman 25 down drawing the arm 24 in the same direction thereby rocking the rocking shaft 22 forwardly and thereby carrying the bars 38 and 39 and 41 and 42 carrying the gripping mechanism and fingers 76 toward the position shown in Fig. 3.

Figures 8, 13, 14, 15:
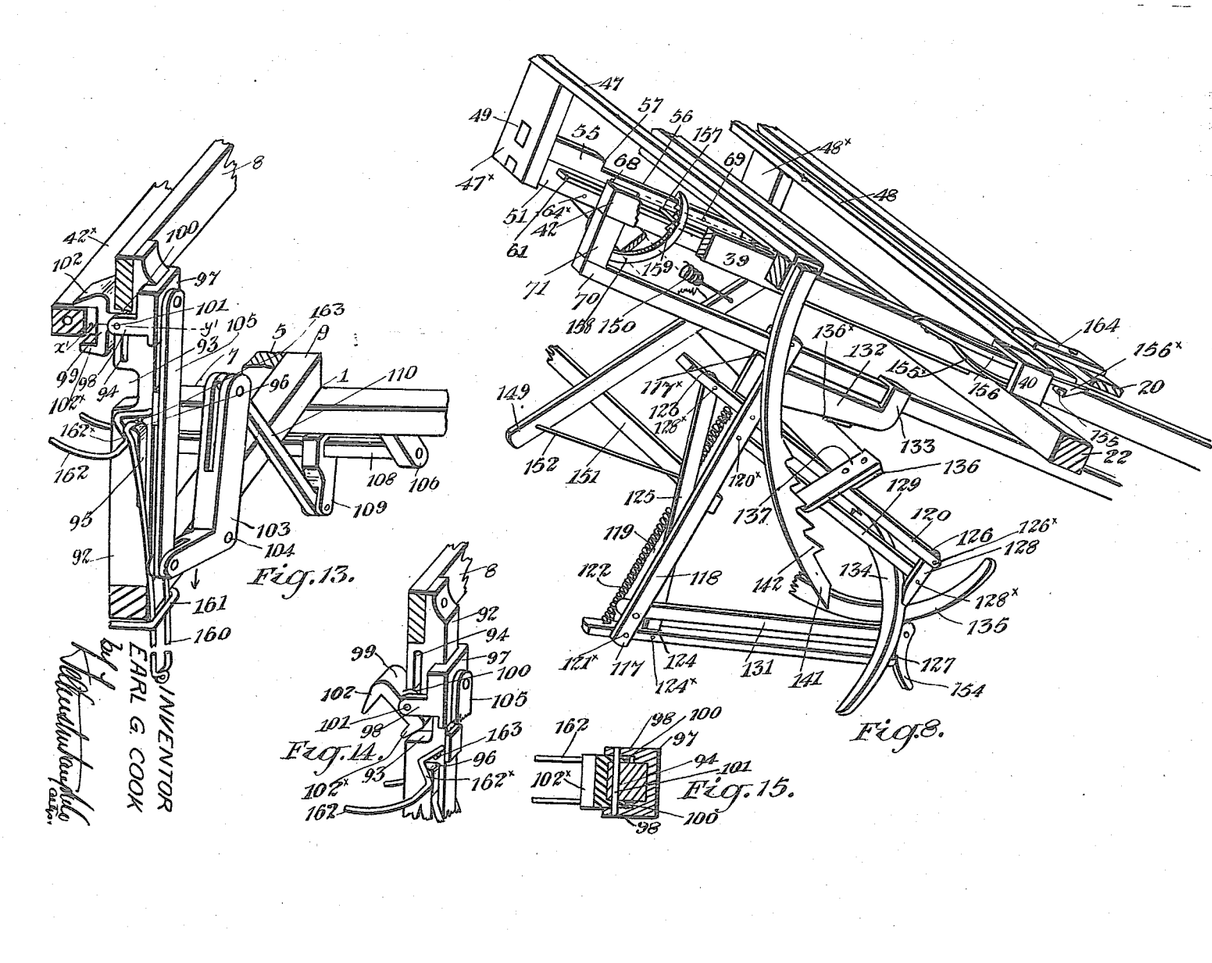
Fig. 8, is a similar view to Fig. 7 showing the parts in the gripping position.
Fig. 13, is an enlarged perspective detail of the mechanism for operating the cut-off preventing the delivery of the sheaves from the deck of the binder into the machine.
Fig. 14, is a perspective detail of the locking mechanism shown in Fig. 13, shown in the locked position.
Fig. 15, is an enlarged sectional detail on line $x'-y'$ Fig. 13.

Simultaneously with this operation the cross bar 42× secured to the forward end of the bars 41 and 42 engages the projection 102× of the locking piece 99 forcing such locking piece downward from the position shown in Fig. 13 to the position shown in Fig. 14 thereby carrying the channel piece 97 in the same direction and forcing the link 105 downward tilting the bell crank 103 in the direction of arrow. The tilting of the bell crank 103 pulls upon the link 110 thereby drawing the arm 109 upward and rocking the rocking rod 108 in a corresponding direction. The rocking of the rod 108 carries the arms 113 upward thereby lifting the cut-off plate 111 from the position shown in full lines in Fig. 6 to the position shown by dotted lines thereby preventing any more sheaves being fed into the machine.

Figures 1, 6:
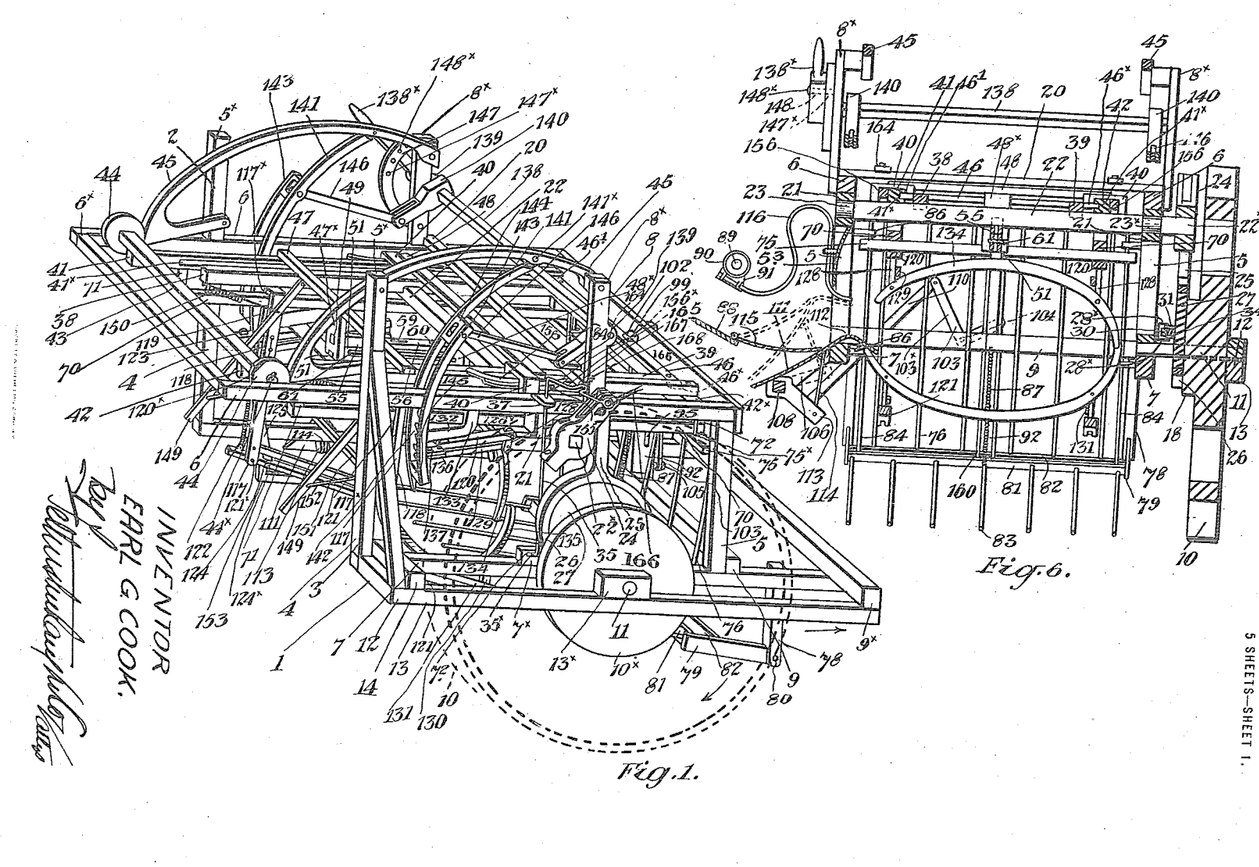
Figure 1, is a general perspective view of my shocker.
Fig. 6, is a cross sectional view taken on a line with the main rocking shaft.

It will be noticed on referring particularly to Figs. 1 and 7 that the tongue piece 137 is normally in engagement with one of the ratchet teeth 142 of the bar 141. As the mechanism is brought into the position shown in Fig. 3 the bar 136 is forced downwardly at its rearward edge on the hinge 136× by reason of such bar being held in the relatively stationary position by the engagement of the tongue piece 137 with the ratchet tooth 142 during the upward movement of the gripping mechanism. The rearward edge of the bar 136 is thereby carried against the upper gripping arm 120 forcing such arm inwardly against the tension of the spring 122. Simultaneously the lower gripping arm 121 is carried toward the upper gripping arm by means of the link connection 125 connecting the upper gripping arm at one side of the center of swing to the lower gripping arm at the opposite side of the center of swing of the arm. In order to further aid the upward movement of the lower gripping arm the pawl 154 is forced into engagement with the ratchet rack 153 thereby tending to force the lower gripping arm upwardly as the gripping mechanism swings rearward and upward.

By the above described mechanism it will, therefore, be seen that the gripping forks 134 and 135 are forced together from the position shown in Fig. 7 to the position shown in Fig. 8, the pieces 130 and 128 and links 131 and 129 serving to hold the forks so that they are forced against the shock substantially at right angles to the shock. Also during the same movement of the mechanism to the position shown in Fig. 3 the cross bar 42× engages with the fork projections 162 forcing them downwardly and the depending portion thereof against the upper end of the loop member 160 forcing the upper end of such loop member out of the horizontal portion 96 of the slot 95.

It will be understood that when the sheaves are fed into the machine to form the shock into the position between the gripping members 134 and 135 that the butt end of the shock rests upon the upwardly inclined fingers 83. It will, therefore, be seen that when the loop member is forced from its normal position in the horizontal portion 96 of the slot 95 into the vertical portion of the slot that the weight of the sheaves carried by the fingers 83 will force such fingers downward from the position shown in Fig. 2 to the position shown in Fig. 3. As the cross bar 136 is forced into the position shown in Fig. 8 the curved finger 158 is carried upwardly so that the ratchet face 159 is brought into engagement with the upper protruding edge of the plate 61 engaging therewith and thereby locking the gripping mechanism in the closed position. As the eccentric 27 continues its rotary movement the rocking shaft 32 is further rocked to carry the bars 38 and 39 and 41 and 42 carrying the gripping mechanism and fingers 76 to the vertical position shown in Fig. 4. As the rocked mechanism is brought into this position the rearwardly projecting ends of the plates 164 engage with the tail end of the pivoted dogs 156 thereby carrying the engaging portion 156× clear of the pins 155 thereby freeing the bars 41 and 42 allowing them to drop vertically and parallelly in relation to the bars 38 and 39 shown in Fig. 3 to the position shown in Fig. 4. It will thus be seen that not only the bars 41 and 42 are carried downward but also the cross bars 48 and 47 connected thereto and the locking mechanism carried by the depending pieces 47× and 48×. By this downward movement of the locking mechanism, of which the bar 51 forms part, one of the pins 157 is brought into engagement with the curved finger 158 thereby drawing such finger in a downward direction. The finger 158 being connected to the cross bar 136 forming part of the gripping mechanism such gripping mechanism is drawn downward on the guide bars 70, the eyes 117× and 133 slidably moving with such guide bars.

Figures 1, 5:
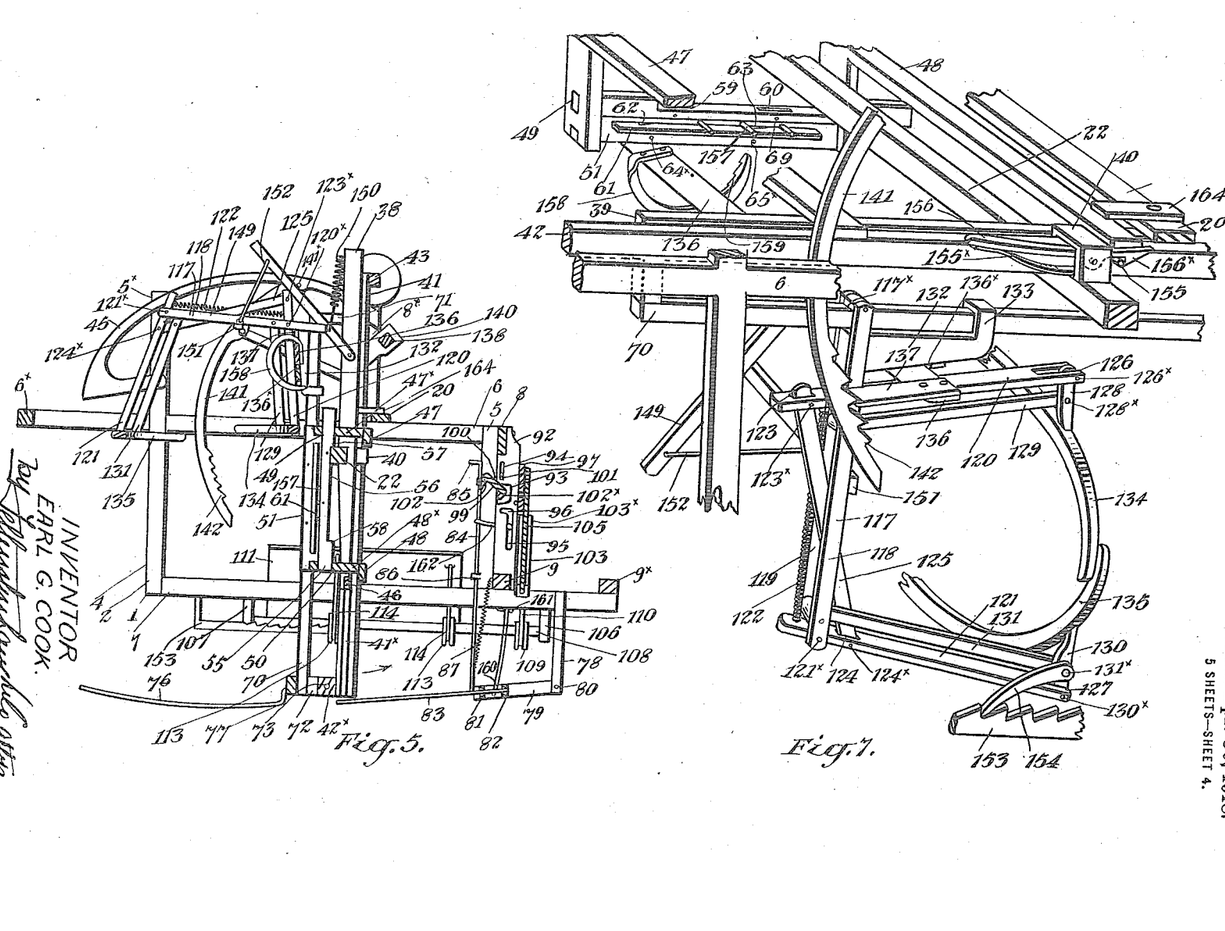
Fig. 5, is a sectional view similar to Figs. 2, 3 and 4 showing the parts in the released position, that is, when the shock is left in the upstanding position on the ground.

As has been before described the gripping mechanism is held in its normal position by means of the tension springs 150. When the pin 157 is brought into engagement with the curved finger 158 the gripping mechanism is drawn down against the tension of the springs 150. Also as the locking mechanism is carried downward as above described the shoulder 58 of the bar 55 is carried away from the rocking bar 22 and the shoulder 57 into contact with the opposite face of the rocking bar 22 thereby forcing the bar 55 longitudinally in the direction of arrow (see Fig. 9) thereby swinging the links 64 and 65 into a position at an opposite angle to that shown in the drawings. As the links swing forwardly in a straight line in the direction of arrow they engage with the inclined slots 62 and 63 of the plate 61 thereby drawing the plate inwardly in the direction of arrow (see Fig. 10) and out of engagement with the ratchet face 159 of the finger 158 thereby releasing such finger which is forced back to the normal position by means of the tension spring 122, which draws the gripping ends of the gripping jaws 120 and 121 apart forcing the cross bar 136 upward to its normal position. By the same movement the finger 158 is carried clear of the pins 157 so that the springs 150 draw the gripping mechanism upward, the eyes 117× and 133 sliding upward over the guide bars 70. By this operation the mechanism is brought from the position shown in Fig. 4 to the position shown in Fig. 5, thereby clearing the shock. As the machine passes forwardly the fingers 76 are drawn outwardly from beneath the shock. When in this position the eccentric 27 has made its complete downward throw and as it passes over the center the rocking movement of the rocking bar 22 is reversed thereby carrying the bars 38 and 39 and 41 and 42 carrying the gripping mechanism and fingers 76 in the reverse direction or in the direction indicated by arrow in Fig. 5, as the mechanism is carried upward away from the fingers 83. These fingers now being relieved of the weight of the sheaves are drawn upward by means of the tension spring 87 to their normal position thereby carrying the loop member 160 back to its normal position in the horizontal portion of the slot 96. By the further upward movement the bar 42× is brought into contact with the upper projecting portion of the locking piece 99 thereby swinging it out of the recess 93 and drawing it vertically upward against the inner face of the vertical member 92 back to its normal position.

In order to insure of the return upward movement of the fingers 83 the cross bar 42× is brought into engagment with the inturned portions 85 of the rods 84 thereby positively drawing up the fingers 83 to their normal position. When the bars 41 and 42 drop downward and are brought to the vertical position as above described the rollers 44 are brought into engagement with the track 45 and as the return rocking movement is performed these rollers travel over the tracks 45 and as such tracks are eccentric to the center of movement, that is to say, gradually increasing in radius rearward the bars 41 and 42 are gradually drawn longitudinally upward in relation to the stationary bars 38 and 39 carried by the rocking bar 22.

It will also be understood that by the upward movement of the locking piece 99 back to its normal position as above described that the bell crank 103 is swung in the opposite direction to arrow (see Fig. 13) thereby carrying the cut-off plate back to its normal position or the position shown by full lines in Fig. 6. This operation is performed by one complete revolution of the driving wheel 10 when in driving engagement with the eccentric 27. At the completion of the above operation and the consequent completion of the revolution of the driving wheel 10 the rounded end of the lever 30 is brought into engagement with the offset portion 37× thereby forcing that end of the lever toward the eccentric against the compression of the spring 34× and the opposite end away from the eccentric so as to draw the pin 28 out of the corresponding recesses 19 and allow the driving wheel 10 to again run free. If during the depositing of the shock more than one sheaf is collected on the delivery end of the deck 88 such extra sheaf will be forced up between the raised cut-off plate 111 and the loop member 116 into the loop of such member and will be retained in such loop until the cut-off plate is again lowered to feed the sheaves into between the gripping forks 134 and 135.

In order to adjust the shock gripping mechanism longitudinally of the shock in accordance with the length of the shock so that the sheaf gripping forks will grip it at the proper point all that it is necessary to do is to withdraw the pin 148× and adjust the lever 138× so as to rock the bar 138 and arms 140 carried thereby so as to carry the notched bar 141 longitudinally of the machine. If it is desired to adapt the gripping mechanism to a longer shock when this adjustment is made the tension springs 151 will serve to draw the tongue plates 137 into engagement with the corresponding notch. If, however, it is desired to adapt the position of the gripping mechanism from the long shock to a short shock it will be first necessary to force the gripping mechanism forwardly against the tension of the springs 151× and then adjust the notch bars by means of the lever 138× to the required position so that the tongue plates 137 will engage therewith. It will be readily seen that if the mechanism is adjusted for a long shock the plate will engage with one of the lower notches but if adjusted for a shorter shock it will engage with one of the upper notches as the bar 141 is swung inwardly or outwardly.

From this description it will be seen that I have devised a very simple form of shocker in which all gears are dispensed with and which may be operated so as to deposit the shock in a secure and stable position at any point desired and the shocks set up in rows convenient for gathering.

What I claim as my invention is—

1. In a shocker, a main frame, a rocking shaft supported in the main frame, a shock gripping device carried by and depending from the rocking shaft, and means for rocking the shaft to swing the entire shock gripping device in the gripping position and the gripped shock bodily upward and rearward to a dropping point and means for giving momentum to the upended shock to impel it while gripped forcibly toward the ground.

2. In a shocker, a main frame, a rocking shaft supported in the main frame, a shock gripping device carried by and depending from the rocking shaft, means for rocking the shaft to swing the entire shock gripping device in the gripping position and the gripped shock bodily upward and rearward to a dropping point, and means for giving momentum to the upended shock to impel it while gripped forcibly toward the ground and for releasing and raising the gripping means vertically clear of the deposited shock.

3. In a shocker, a main frame, a rocking shaft carried by the main frame, shock supporting means, shock gripping means, a depending structure carried by the rocking shaft carrying the shock gripping means, means for drawing the shock gripping means together into contact with the shock and for swinging the shock gripping means and supporting means from the receiving position to the discharge position whereby the shock is upended, and means for simultaneously releasing the shock gripping means and shock supporting means to allow of the shock supporting means and shock gripping means to drop vertically to carry the butts into contact with the ground.

4. In a shocker, a main frame, shock receiving and gripping means comprising two gripping members, means for turning the gripping members to upend the shock, and means for swingably carrying the gripping members whereby the center of swing about which the shock turns is raised as the shock is turned into position for deposit.

5. In a shocker, a main frame, a rocking shaft carried by the main frame, shock supporting means and shock gripping means carried by the rocking shaft and depending therefrom, means for drawing the shock gripping means together into contact with the shock and for swinging the shock gripping means and supporting means from the receiving position to the discharge position whereby the shock is upended, means for simultaneously releasing the shock gripping means and shock supporting means to allow the supporting means and gripping means to drop vertically to carry the butt of the shock into contact with the ground, and means for releasing the shock gripping means and carrying the shock gripping means upwardly clear of the shock.

6. In a shocker, the combination with the main frame, a rocking shaft journaled in the main frame, parallel bars carried by the rocking shaft intermediately of their length and extending at right angles thereto, sheaf gripping means carried by the bars at one side of the rocking shaft and shock supporting means carried by the ends of the bars at the opposite side of the rocking shaft, and means for automatically carrying the shock gripping means into engagement with the shock as the rocking shaft is rocked to carry the gripping means and shock supporting means into position for depositing the shock and for automatically releasing the sheaf gripping means at the end of such rocking movement.

7. In a shocker, the combination with the main frame, of a rocking shaft journaled in the main frame, a supporting device carried by the rocking shaft and extending at right angles thereto, sheaf gripping means carried at one end of the supporting device and shock supporting means carried at the opposite end of the supporting device, means for automatically carrying the shock gripping means into engagement with the shock as the rocking shaft is rocked to carry the mechanism into position for depositing the shock, means for carrying the sheaf supporting means and sheaf gripping means simultaneously downward, and means for releasing the sheaf gripping means at the end of its downward movement.

8. In a shocker, the combination with the main frame, of a rocking shaft journaled in the main frame, a supporting device carried by the rocking shaft and extending at right angles thereto, sheaf gripping means carried at one end of the supporting device and shock supporting means carried at the opposite end of the supporting device, means for carrying the shock gripping means into engagement with the shock as the rocking shaft is rocked to carry the mechanism into position for depositing the shock, means for carrying the sheaf supporting means and sheaf gripping means simultaneously downward, means for automatically releasing the sheaf gripping means at the end of its downward movement, and means for adjusting the sheaf gripping means to and from the sheaf supporting means.

9. In a shocker, the combination with the main frame, of a rocking shaft journaled in the main frame, bars carried by the rocking shaft intermediately of their length and extending at right angles thereto, hanger bars slidably connected to the aforesaid bars, sheaf gripping mechanism extending at right angles to the hanger bars, and means for automatically carrying the sheaf gripping mechanism together to grip the sheaf during the upward rocking movement of the rocking shaft.

10. In a shocker, the combination with the main frame, of a rocking shaft journaled in the main frame, a supporting member carried by the rocking shaft and extending at right angles thereto, arms depending from the supporting member, sheaf gripping jaws carried by the depending arms, means for automatically drawing the sheaf gripping jaws together to grip the sheaf during the rocking movement of the rocking shaft, and means for automatically releasing and carrying the jaw members apart at the end of such upward movement.

11. In a shocker, the combination with the main frame, of a rocking shaft journaled in the main frame, a supporting member carried by the rocking shaft and extending at right angles thereto, arms depending from the supporting member and connected thereto to slide longitudinally thereof, sheaf gripping jaws carried by the depending arms, means for automatically drawing the sheaf gripping means together to grip the sheaf during the upward movement of the rocking shaft, resilient means for holding the depending arms in their normal position, and means for forcing the gripping jaws downward against the resilient means as the supporting member is carried to a vertical position.

12. In a shocker, the combination with the main frame, of a rocking shaft journaled in the main frame, a supporting member carried by the rocking shaft and extending at right angles thereto, a shock supporting device carried by the rocking shaft and slidable longitudinally of the supporting member, releasable means for holding the shock supporting means in its normal position, means for automatically releasing such means when the supporting member is carried to the vertical position, shock gripping means slidably carried by the supporting means, resilient means for holding the sheaf gripping means in its normal position, and means for forcing the sheaf gripping means downward against the resilient means by the downward movement of the shock supporting means.

13. In a shocker, the combination with the main frame, of a rocking shaft journaled in the main frame, a supporting member carried by the rocking shaft and extending at right angles thereto, arms depending from the supporting member, a slidable connection between the arms and the supporting member, sheaf gripping jaws carried by the arms, means for automatically drawing the sheaf gripping jaws together to grip the sheaf during the upward rocking movement of the rocking shaft, means for automatically locking the gripping jaws in their closed position, a shock supporting member slidably carried by the rocking shaft, releasable means for holding the supporting member in its normal position, means for releasing such means when the supporting member is carried to a vertical position, and means for drawing the gripping jaws downward with the shock supporting means and for automatically releasing such gripping jaws at the end of the downward movement.

14. In a shocker, the combination with the main frame, of a rocking shaft journaled in the main frame, a supporting member carried by the rocking shaft and extending at right angles thereto, shock gripping members carried by the supporting member, shock supporting means carried by the rocking shaft and movable at right angles thereto, releasable means for securing the shock supporting means in its normal position, means for releasing such releasable means when the supporting member is carried to a vertical position so as to allow the shock supporting means to drop vertically, and means for automatically returning the shock supporting member to its normal position by the reverse rocking movement of the rocking shaft.

15. In a shocker, the combination with the main frame, of a rocking shaft journaled in the main frame, a supporting member carried by the rocking shaft and extending at right angles thereto, sheaf supporting member slidably carried upon the rocking shaft, releasable means for holding the sheaf supporting member in its normal position, means for releasing such releasable means when the supporting member is carried to a vertical position, rollers mounted upon the slidable portion of the shock supporting member and curved trackways carried by the main frame and eccentric to the center of the swing of the rocking shaft and coacting with the rollers to draw the slidable portion of the shock supporting means back to its normal position during the return movement of the rocking shaft.

16. In a shocker, the combination with the main frame, of a rocking shaft carried by the main frame, a horizontal support carried by the rocking shaft at right angles thereto, sheaf gripping mechanism carried by the supporting member and comprising arms depending therefrom, upper and lower sheaf gripping arms pivotally secured intermediately of their length to each depending arm and resiliently connected together at one end and gripping jaws carried by the opposite end of the gripping arms, a notched member carried by the main frame, and a bar hingedly connected to the shock gripping device and resting flat against the upper sheaf gripping arms, and projections extending outwardly from the movable edge of the hinge bar into the notched member.

17. In a shocker, the combination with the main frame, of a rocking shaft journaled in the main frame, a supporting structure carried by the main frame and extending at right angles thereto, arms depending from the main frame at each side thereof and to the rear of the center of swing, upper and lower parallel bars pivotally connected to each of the depending arms, a tail piece extending from each upper and lower parallel bar, a link bar connecting the tail piece of the upper parallel bar with the lower parallel bar at the opposite side of the fulcrum of such bar, resilient means for connecting the tail pieces of the upper and lower bars together, and means for drawing the lower parallel bars inwardly during the upward movement of the rocking shaft.

18. In a shocker, the combination with the main frame, of a rocking shaft journaled in the main frame, a supporting structure carried by the main frame and extending at right angles thereto, arms depending from the supporting structure at each side and to the rear of the center of swing, upper and lower parallel bars pivotally connected to each depending bar, a tail piece extending from one of each of the lower parallel bars, a tail piece extending from one of each of the upper parallel bars, a link bar connecting each upper tail piece with the lower parallel bar, and yieldable means connected to the tail pieces for holding the upper and lower parallel bars normally apart.

19. In a device of the class described, the combination with the upper and lower gripping members and their support, of a bar hingedly connected to such support and bearing against the upper gripping members, means for forcing such bar against the upper gripping member to carry the gripping members together as they are carried from the receiving to the discharging position, and means for automatically locking such bar in position to hold the sheaf gripping members in the gripped position.

20. In a shocker, the combination with the main frame, a rocking shaft carried by the main frame, a supporting structure carried by the rocking shaft and upper and lower sheaf gripping members carried by the supporting structure, of a cut-off plate designed to prevent the feeding of the sheaves to between the gripping members during the depositing of the shock, and means operated by the forward rocking movement of the rocking shaft and supporting structure for raising the cut-off plate into an obstructing position.

21. In a shocker, the combination with the main frame, a rocking shaft carried by the main frame, a supporting structure carried by the rocking shaft having a cross bar at its forward end, a slidable locking piece carried by a suitable portion of the main frame and having an upper and lower projection extending above and below the cross bar, a cut-off plate, a rocking rod having arms, a link connection between the ends of the arms and cut-off plate, a bell crank, an arm carried by the rocking rod, a link connection between the arm and one arm of the bell crank, and a link connection between the other arm of the bell crank and the slidable locking piece.

22. In a shocker, the combination with the main frame, a rocking shaft carried by the main frame, a supporting structure carried by the rocking shaft, a normally vertical shock supporting structure bearing against the butt ends of the sheaves and carried by the supporting structure at one end, shock gripping means carried by the supporting structure in proximity to the opposite end, resiliently supported substantially horizontal pivoted means inclined upward from the pivot point for supporting the butts of the sheaves in the receiving position, releasable means for holding the butt supported means in its upwardly inclined position, and means for releasing such releasable means by the downward movement of the supporting structure carried by the supporting shaft.

23. In a shocker, the combination with the main frame, a rocking shaft carried by the main frame and a supporting structure carried by the rocking shaft, shock gripping device slidably carried by the supporting structure and comprising a depending arm and upper and lower gripping arms pivoted in the depending arms and carrying gripping forks, a hinge bar carried by the sheaf gripping device, a swingably supported depending curved bar having a series of notches, tongue pieces carried by the hinge bar, resilient means for carrying the shock gripping means forward to carry the tongues into engagement with the aforesaid notches, means for swinging the hinge bar against the upper gripping arm during the upward rocking movement of the rocking shaft, means for adjustably setting the position of the notch bar longitudinally of the machine, and resilient means for drawing the shock gripping mechanism to carry the tongue pieces of the hinge bar into engagement with the notch bar.

24. In a device of the class described, the combination with the main wheel shaft, of a main wheel having a concentric series of recesses formed around the hub, an eccentric also mounted upon the main wheel shaft having an orifice therein in alinement with the recesses of the hub, a plunger held within such orifice, a spring held lever pivotally mounted upon the eccentric and engaging at one end with the plunger, a vertical rod mounted upon a suitable support and having an outwardly projecting portion designed to engage with the outer end of the lever, and spring means for holding such outwardly extending portion in the engaged position.

25. In a shocker, the combination with the main frame adapted to receive the sheaves through the side of the frame in proximity to the binder deck, upper and lower gripping forks adapted to receive sheaves passing through the frame side, a cut-off plate horizontally disposed and having an inverted V portion, means for raising the plate to automatically obstruct the entrance of a sheaf when fed to the point of entrance between the gripping forks during the depositing of a shock, and a hinge plate hinged at one edge to the binder deck and resting at its free edge in the cut-off plate.

26. In a shocker, the combination with the main frame having a sheaf receiving opening at one side thereof, of a rocking shaft carried by the main frame, a supporting structure carried by the rocking shaft and having a cross bar at its forward end, sheaf forming mechanism carried by the supporting structure, a bell crank carried by the main frame, means connected to one arm of the bell crank engaging with the cross bar of the supporting structure when the structure is tilted to the horizontal position, a suitably supported rocking shaft, an arm extending therefrom, a link connection between the other arm of the bell crank and the arm of the rocking shaft, a cut-off plate designed to normally rest at its lower end upon the rocking shaft and having an inverted V-shape upper end, and a link connection between the arm of the rocking shaft and the upper end of the cut-off plate.

27. In a shocker, the combination with the main frame, of a rocking shaft carried by the main frame, a horizontal support carried by the rocking shaft at right angles thereto, sheaf gripping mechanism slidably carried upon such supporting structure, resilient means for holding the sheaf gripping members in position, such gripping mechanism comprising depending arms, upper and lower sheaf gripping arms pivotally secured intermediately of their length to each depending arm and resiliently connected together at one end, gripping jaws carried by the opposite end of the gripping arms, a swingable member carried by the main frame and having a series of notches, a bar hingedly connected to the shock gripping device and resting flat against the upper sheaf gripping arms, projections extending outwardly from the movable edge of the hinge bar into one of the aforesaid notches, and means for adjusting and holding the swingable notch bar in position.

28. In a shocker, the combination with the main frame, of a swinging member supported by the main frame and carrying vertically movable shock forming mechanism including shock gripping members spring held apart, a notched member forming a fulcrum, a hinged bar carried by the swinging member, means engaging the fulcrum member for forcing the hinged bar against the gripping members to force them together, and locking means for holding the gripping members in the gripping position releasable by the vertical movement of the shock forming mechanism.

29. In a shocker, the combination with the main frame having a lateral inlet opening for the sheaves, of a cut-off plate supported at the bottom of the opening, and means for raising the cut-off plate upwardly to obstruct the opening, and upwardly looped members carried above the cut-off plate and designed to receive the sheaves during the delivery of the shock.

30. In a shocker, means for gripping the shock, means for raising the shock above the receiving point as it is upended, means for driving the shock downward forcibly against the ground, means for locking the gripping means around the shock during the raising and downward drive thereof, and means for automatically releasing such locking means and carrying the gripping means vertically upward as the shock strikes the ground.

EARL GOODWIN COOK.

Witnesses:
M. EGAN,
M. RUMBLE.

Copies of this patent may be obtained for five cents each, by addressing the "Commissioner of Patents, Washington, D. C."